United States Patent

Kapoor et al.

[11] Patent Number: 5,523,158
[45] Date of Patent: Jun. 4, 1996

[54] BRAZING OF DIAMOND FILM TO TUNGSTEN CARBIDE

[75] Inventors: Rakesh R. Kapoor, Shrewsbury; Bela G. Nagy, Acton; Louis K. Bigelow, Boylston, all of Mass.

[73] Assignee: Saint Gobain/Norton Industrial Ceramics Corp., Worcester, Mass.

[21] Appl. No.: 283,311

[22] Filed: Jul. 29, 1994

[51] Int. Cl.$^6$ ............................................. B24D 11/00
[52] U.S. Cl. .......................... 428/408; 407/119; 51/295; 51/307; 51/309; 428/469; 428/698
[58] Field of Search .................... 428/469, 408, 428/698; 51/295, 307, 309; 407/119

[56] References Cited

U.S. PATENT DOCUMENTS

| | | | |
|---|---|---|---|
| 2,840,468 | 6/1958 | Brenner | 75/165 |
| 4,009,027 | 2/1977 | Naidich et al. | 75/154 |
| 4,063,909 | 12/1977 | Mitchell | 51/295 |
| 4,601,423 | 7/1986 | Pipkin et al. | 228/121 |
| 4,670,025 | 6/1987 | Pipkin | 51/295 |
| 4,899,922 | 2/1990 | Slutz et al. | 51/293 |
| 4,919,220 | 4/1990 | Fuller et al. | 175/329 |
| 5,273,832 | 12/1993 | Mizuhara et al. | 420/512 |
| 5,392,982 | 2/1995 | Li | 228/124.5 |

*Primary Examiner*—A. A. Turner
*Attorney, Agent, or Firm*—Volker R. Ulbrich; Bruce F. Jacobs

[57] ABSTRACT

The reliability of a braze joint formed between a diamond film and a tungsten carbide body is increased by use of a vandium containing braze. The braze joint exhibits an average shear strength greater than about 40,000 pounds per square inch, (276 MPa) and the braze exhibits a contact angle with the diamond film of less than about 15°.

4 Claims, No Drawings

BRAZING OF DIAMOND FILM TO TUNGSTEN CARBIDE

FIELD OF THE INVENTION

The present invention is directed to cutting tools that contain a diamond cutting element. More particularly, the present invention is directed to a cutting tool in which the cutting element is a diamond film. Still more particularly, the present invention is directed to diamond film cutting tools containing cutting elements comprising a diamond film attached to a tungsten carbide body wherein the attachment is improved by the use of a vanadium containing braze composition.

BACKGROUND OF THE INVENTION

It is important for the continued successful utilization of diamond tools that such tools be capable of withstanding extremely severe conditions of use without the diamond cutting surface breaking free from the tool. Diamond cutting tools are commonly prepared by adhering a diamond cutting element to an extremely hard and durable tool substrate material such as tungsten carbide. For flat tools, such as those intended for use on a metal lathe, the diamond cutting elements are typically in the form of small triangular "inserts" which are clamped in place on a larger, bar-shaped "tool holder" which is held in a lathe or similar machine during actual use. Traditionally such inserts have been based upon a polycrystalline compact diamond (PCD) body which has tungsten carbide on one surface. Polycrystalline diamond compacts are a mixture of a binder such as cobalt and diamond powder. Such diamond compact materials are relatively thick, e.g. about 0.080" (2.03 mm), and relatively short in length, e.g. about 0.065" (1.65 mm) maximum. To form a cutting element, the tungsten carbide surface of the PCD is brazed to a larger tungsten carbide body.

In many applications, however, polycrystalline compact diamonds have been found unacceptable due to the presence of the cobalt or for insufficient hardness. Chemical vapor deposited (CVD) diamond film does not contain cobalt which can increase surface friction as well as be a contaminant for a workpiece. Moreover, CVD diamond film is harder than a PCD body. Accordingly, there is an increasing desire to utilize diamond film to form cutting elements. To do so in a manner which allows the direct commercial substitution for CVD diamond for PCD, however, requires adhering CVD diamond to a tungsten carbide strip so that it can be subsequently joined to a larger tungsten carbide body by a braze.

Due to the high temperatures experienced by the cutting element both in use as well as during adherence of one tungsten carbide surface to another, high temperature brazes have been used to join a diamond film to tungsten carbide. However, CVD diamond films do not readily adhere to tungsten carbide, nor many other surfaces, and thus the art has previously used brazing alloys which contain metals which will improve the wetting of the braze alloy on the diamond film, generally by reacting with the carbon thereof to form carbides. Such metals have been referred to in the art as "active metals" or "reactive metals" and include such as titanium, tantalum, chromium, nickel, and the like. Prior to this invention, the art believed that the best active metal for adhering a CVD diamond film was titanium due-to its known ability to react with carbon and form titanium carbide (TIC). Such alloys are generally referred to in the brazing art as "active metal brazes" or "active brazing alloys" or "reactive brazing alloys" or "reactive metal brazing alloys."

Specifically, copending application Ser. No. 07/848,617 filed Oct. 8, 1993, entitled "Diamond Film Cutting Tool" (Attorney Docket DF-2624), assigned to the assignee of this application, discloses the brazing of a diamond film to a tungsten carbide surface by standard active brazing techniques with a reactive metal braze alloy based upon silver, gold, palladium, and the like. In addition to the above metals, the braze further contained a metal capable of forming a carbide thereof at the interface with the diamond film, such as Ti, Ta, Cr, and Mn. The braze used in the Examples was an ordinary silver-copper braze containing Ti or Ta as the active/reactive metal.

U.S. Pat. No. 5,020,394 discloses brazing a CVD diamond film to the rake face of a tool base by means of a two-step brazing process which is both expensive and results in a poor quality bond.

Saint-Gobain Corporation currently manufactures diamond film cutting elements wherein a CVD diamond film is joined to tungsten carbide by means of a commercially available reactive metal braze alloy (Lucanex 721 from Lucas-Milhaupt Inc., 5656 South Pennsylvania Avenue, Caudahy, Wis. 53110), which contains 72 parts silver, 28 parts copper, and 5 to 10 parts titanium.

It is an object of the present invention to improve the reliability of the bond between a diamond film cutting element and a tungsten carbide substrate to which the cutting element is attached.

SUMMARY OF THE INVENTION

The present invention is directed to the formation of brazed joints between a diamond film and a tungsten carbide body which are more reliable than current commercially formed joints between the same materials. The braze in the joints is a vanadium containing alloy. Preferably, the braze is an alloy which contains a major amount of gold and a minor amount of vanadium.

DETAILED DESCRIPTION OF THE INVENTION

The present invention is directed to a joint formed between a diamond film layer and a tungsten carbide body by means of a vanadium containing braze alloy.

The overall reliability, and thus commercial applicability, of a joint formed between two dissimilar surfaces (such as a diamond film and tungsten carbide) by means of a braze is dependent upon not only (i) the absolute shear strength of the joint but also (ii) the capacity of the braze to flow and thereby completely fill the space between the surfaces being joined, i.e. ability to avoid the creation of any voids therebetween. The shear strength of a particular joint can be determined by preparing multiple samples thereof and subjecting the samples to shear testing. Generally, an average shear strength of at least about 40,000 pounds per square inch (276 MPa). This is equal to about 2500 pounds for a joint having an area of about 0.0625 square inches. The capacity of a braze to flow, commonly referred to as "wetting" or "wettability" or "flow characteristics" can be evaluated by determining the contact angle between the braze and a surface when the braze is melted on that surface. A low contact angle indicates a high capacity for wetting; thus the lower the contact angle the greater the likelihood of the absence of any voids and the increased reliability of the overall structure. For good wetting and spreading of a braze on a particular surface, a contact angle of less than about 15° is desired. Such a low contact angle provides sufficient capillary force to fill the interfacial voids and to flow into any asperities on the surface.

Diamond films suitable for use in this invention include those films which have been formed by a chemically deposited vapor process as well as polycrystalline diamond films prepared by other procedures known in the diamond film art. Also preferably, the diamond film has a cutting edge and a substantially flat surface to help prevent the formation of any gaps when the diamond film is attached to the surface of the tungsten carbide substrate. The diamond film preferably exhibits a high Young's modulus, i.e. greater than about 1000 GPa, and also has a high thermal stability, i.e. greater than about 700° C.

A polycrystalline diamond film may be manufactured by any suitable technique known in the art which produces a diamond material with sufficient toughness for use in tool applications, including microwave plasma chemical vapor deposition (CVD) (generally described in Japanese Laid-Open Patent Appln. No. 58-100494), neutral ion CVD methods (generally disclosed in Japanese Laid-Open Pat. Appln. No. 58-91100), plasma torch technology, or arc-jet processing. It is presently preferred to employ the arc-jet method to form the polycrystalline diamond film. The type of apparatus used for the arc-jet deposition is described, for example, in U.S. Pat. No. 4,682,564, its disclosure incorporated herein by reference. Presently known methods generally involve the disassociation of hydrogen as a facilitating gas and methane as a carbon source by heating the gases to a plasma with a hot wire, combustion torch, plasma torch, microwave source, arc jet, and the like. The heating occurs in a partial vacuum near the surface of a deposition substrate, such as silicone or molybdenum, to cause diamond to form as a layer thereon.

The tungsten carbide body of the invention is preferably in the shape of a conventional diamond cutter element, typically a small triangular "insert." Such inserts are well known in the art and are conventionally used by attaching them onto a larger, bar-shaped "tool holder" which is held in a lathe. Alternatively, the tungsten carbide may be an assembly piece that has been or will be thereafter permanently affixed to a larger workpiece by brazing or other suitable chemical joining technique. Of course, the surface of the tungsten carbide body being joined should be relatively smooth so that it will easily be coated with the braze.

The braze used to form the joints of this invention must contain vanadium. The vanadium will be present in the braze in an amount sufficient to improve the performance of the braze in joining a diamond film to tungsten carbide as compared to a chemically similar braze containing titanium. Generally the vanadium will be present in the braze as a minor amount, i.e. about 0.5 to 10%, preferably about 0.75 to 5%, most preferably about 1 to 3%, by weight. Such suitable brazes will have a melting temperature that is lower than the melting temperature of tungsten carbide. Such suitable brazes must further be capable of remaining in a liquid state for a sufficiently long period of time so that the diamond surface can be wetted by the braze before the braze cools, solidifies, and bonds to the substrate. The melting (liquidus) temperature of the braze will vary with the particular composition thereof but is commonly in the range of about 750° to 1,200° C. In addition to vanadium, the braze contains additional metals such as gold and nickel. Preferably, at least one of the additional metals will be gold. More preferably the additional metals will be a mixture of gold and nickel. Still more preferably, the braze will contain at least about 1 weight % vanadium, at least about 95 weight % gold, and the balance being nickel. Most preferably, the braze contains about 1.25–2.25% vanadium, about 96.5–98.5% gold and about 0.25–1.25% nickel. Such a braze is available as a foil from Wesgo Division of GTW Products Corporation under the trade name Gold-ABA(H).

Unless the materials have been pre-cleaned, the procedure for forming a brazed joint of this invention generally begins with the cleaning of the diamond film, the braze alloy, and the tungsten carbide surface of all contaminants. When the braze is used in the form of a foil, it is preferably cleaned ultrasonically by placing it in a beaker that contains an appropriate degreasing solvent (such as acetone or an alcohol), and then placing the beaker in a commercial ultrasonic cleaner and agitated ultrasonically for about 3 to 15 minutes continuously. Oil and grease can be removed from the tungsten carbide with a suitable degreasing solvent, by vapor degreasing or by alkaline cleaning. While not necessary, a conventional flux may be used.

Once the braze and tungsten carbide have been cleaned, a suitable amount of braze is placed between the diamond film and the tungsten carbide to be bonded, the three components held together in a predetermined relationship, and heated in a furnace, preferably a vacuum furnace, to a temperature sufficiently high to melt the braze and for a period sufficiently long to form the joint. Vacuums of better than $1\times10^{-5}$ Torr, preferably better than $5\times10^{-6}$ Torr, and most preferably better than $1\times10^{-6}$ Torr should be used.

The heating from room temperature up to the brazing temperature should occur relatively quickly so as to minimize diffusion of any impurities present in the system. Preferably, a heating rate of about 100° C. per minute is used until within 20° C. of the solidus temperature of the braze. Then the rate is quickly decreased, for example to 30° C., until the temperature passes the liquidus temperature of the braze and reaches the brazing temperature. This procedure has been found to minimize the likelihood of overshooting the desired brazing temperature which, for certain brazes may be 100° C. higher than the liquidus temperature of the braze which is commonly up to 50° C. higher than the solidus temperature. More commonly, however, the brazing temperature is only about 5° to 60° C. higher than the liquidus temperature of the braze.

After reaching the brazing temperature, the braze melts, wets the surfaces of the diamond film and tungsten carbide, and joins them together. When the braze melts, the carbon in the diamond film is believed to react with the vanadium in the brazing alloy and facilitate the formation of a strong adhesive bond. The joined materials are generally held at the brazing temperature for several minutes, e.g. about 2 to 10, before cooling to room temperature.

The gap between the diamond film and the tungsten carbide which contains the brazing alloy will generally be in the range of from about 10 μm to about 100 μm depending upon the specific brazing alloy used. With the preferred gold-vanadium-nickel brazing alloy foil, no benefit was observed from using more than a single layer of foil and a joint gap more than about 30 μm.

A particularly advantageous way to join a diamond film to a tungsten carbide cutting element is by means of pre-brazing a diamond film with a vanadium-containing braze, and then joining the vanadium braze coated surface of the diamond film to the tungsten carbide cutting element by means of a conventional braze. In this variation, a vanadium-containing braze is first substantially distributed on a diamond film surface. The resulting vanadium braze layer is then heated to its melting temperature, e.g. greater than about 1100° C., and bonds to the diamond film. Thereafter, a conventional braze is substantially distributed on the braze surface of the diamond film. The conventional braze must melt at a lower temperature than the vanadium braze. The prebrazed diamond film, the conventional braze, and the tungsten carbide substrate are then heated to the melting temperature of the conventional braze, and the brazed diamond film surface is then joined to the tungsten carbide, and cooled. Suitable conventional brazes may include metals such as titanium, tantalum, chromium, nickel, and the like, in addition to conventional filler metals such as nickel, copper, silver and the like. This technique enables the tool manufacturer to braze a diamond film to a tungsten carbide cutting element without the need of expensive equipment and exacting vacuum conditions which are ordinarily required to braze tungsten carbide to a diamond film.

The present invention will now be described with reference to the following examples in which all parts and percents are by weight unless otherwise specified. It is understood that these examples are for illustrative purposes only and should not be deemed to limit this invention.

EXAMPLE 1

A brazed joint was formed between a polycrystalline diamond film formed by the DC arc jet deposition techniques substantially as described in U.S. Pat. No. 4,682,564 and tungsten carbide. The braze contained 97.5% gold, 1.75% vanadium, and 0.75% nickel and was used a single layer of foil about 0.002" thick. The diamond film and the tungsten carbide were held in place with a 30 μm joint gap. The brazing was performed at a temperature of 1125° C. and with a brazing time of 10 minutes. The braze was pre-cleaned ultrasonically for three minutes in alcohol, and the tungsten carbide surface was pre-cleaned with conventional oil-reducing chemical solvents. After pre-cleaning, the braze and the tungsten carbide were stored in a vacuum desiccator. Shortly before actual use, the tungsten carbide surface to be joined to the diamond film was recleaned with alcohol.

The brazing was conducted in a conventional three-zone tube vacuum furnace manufactured by Lindbergh, Inc. The furnace features three heating zones, wherein the two side zones are set up in a "slave" configuration and the central zone is set up in a "master" configuration. The furnace's process chamber consists of a 2.75 inch dia. quartz tube that provides a vacuum level of more than $1.0 \times 10^{-5}$ Torr.

To evaluate the quality of the brazed joint produced by the vanadium containing braze, multiple samples thereof were prepared as above and evaluated for shear strength. The shear strength was determined using an Instron Tester with a fixture which ensured that the shearing tool applied force in a direction perpendicular to the edge of the brazed specimen. The average shear strength was 2,706.7 pounds for a joint having an area of about 0.0625 square inches, i.e. 43,307 psi (299 MPa).

To determine the wettability of diamond film by the braze, a sample of the braze alloy was melted on an unpolished surface of a diamond film specimen and the contact angle between the braze and the diamond film identified. The braze exhibited an exceptionally low contact angle of only 7°–8°.

COMPARATIVE EXAMPLE A

For comparison purposes, the procedure of Example 1 was repeated except that the vanadium containing braze was replaced by a titanium braze containing similar amount of gold and nickel as the vanadium braze of Example 1o Specifically the braze contained 96.4 parts gold, 3 parts nickel, and 0.6 parts titanium. The liquidus of this alloy was slightly lower (1030° C. v. 1070° C.) than that of Example 1 and the maximum brazing temperature used was also slightly lower, i.e. 1050° C.

The average shear strength of the titanium-gold-nickel braze sample was 585.8 pounds for a joint having an area of about 0.0625 square inches, (9,373 psi or 65 MPa) only 21% of the average shear strength of the vanadium alloy of Example 1.

When a contact angle measurement was attempted with the titanium-gold-nickel alloy, the braze oxidized and the surface appeared discolored. The alloy did not wet as well as the vanadium alloy and it exhibited a much higher contact angle with the diamond film.

COMPARATIVE EXAMPLE B

For comparison purposes, the procedure of Example 1 was repeated except that the vanadium containing braze was replaced by the titanium braze disclosed in the above-referenced copending application Ser. No. 07/848,617, filed Oct. 8, 1993, (Docket DF-2624), and utilized by Saint-Gobain Corporation in the manufacture of diamond film cutting elements, i.e. Lucanex 721 which contains 72 parts silver, 28 parts copper, and 5 to 10 parts titanium. The liquidus of this braze is 779° C. and the maximum brazing temperature was 960° C.

The average shear strength of the brazed sample was 1,684 pounds for a joint having an area of about 0.0625 square inches, (26,944 psi or 186 MPa) 62% of the strength of the vanadium braze of Example 1.

The contact angle of the braze on a diamond film surface was about 25°, more than 3 times that of the vanadium braze of Example 1.

COMPARATIVE EXAMPLE C

For comparison purposes, the procedure of Example 1 was repeated with a copper-silicon-titanium-aluminum braze in lieu of the vanadium containing braze of Example 1. Specifically the braze contained 92.75 parts copper, 3 parts silicon, 2.25 parts titanium, and 2 parts aluminum. The liquidus of this alloy is 1024° C. and the maximum brazing temperature was 1050° C. Prior to use, the foil braze was dipped in 5 vol % nitric acid and distilled water solution to remove surface oxides that has formed on the alloy during storage.

The average shear strength of the copper-titanium braze sample was 2,772.8 pounds for a joint having an area of about 0.0625 square inches, (44,365 psi or 306 MPa), 2% higher than the vanadium alloy of Example 1.

The contact angle between the braze and a diamond film was determined to be 61°, vastly inferior to that observed with the vanadium braze of Example 1. Despite the excellent shear strength result, the extremely high contact angle indicates that the likelihood of failure due to the braze forming voids with a diamond film is unacceptably high from a reliability standpoint. Thus the braze is unacceptable for commercial use.

COMPARATIVE EXAMPLE D

The procedure of Example 1 was repeated with a further brazing alloy composition which contains an active metal and also has a high melting point. Nicrobraz 210 from Wall Colmoney Inc., which contains 51.52 parts cobalt, 19 parts chromium, 17 parts nickel, 8 parts silicon, 4 parts tungsten, 0.4 parts carbon, and 0.08 parts boron, has a liquidus of 1150° C. The brazing temperature was a maximum of 1230° C.

While the contact angle of the braze on a diamond film surface was excellent, about 12°, the average shear strength of the brazed sample was only 20 pounds for a joint having an area of about 0.0625 square inches. This is equivalent to merely 320 psi or 2 MPa. Despite the excellent contact angle result, the extremely low shear strength makes the braze unacceptable for commercial use.

What is claimed is:

1. A cutting tool comprising a diamond film cutting element attached to a tungsten carbide substrate by means of a braze therebetween wherein said braze comprises vanadium.

2. The cutting tool of claim 1, wherein the vanadium is present in an amount of about 0.5 to 10 wt. % of the weight of the braze.

3. The cutting tool of claim 1, wherein the braze comprises at least about 1 wt. % vanadium, at least about 95 wt. % gold, and the balance nickel.

4. The cutting tool of claim 1, wherein the diamond film has a Young's modulus greater than about 1000 GPa and a thermal stability of greater than about 700° C.

* * * * *